Figure 1:
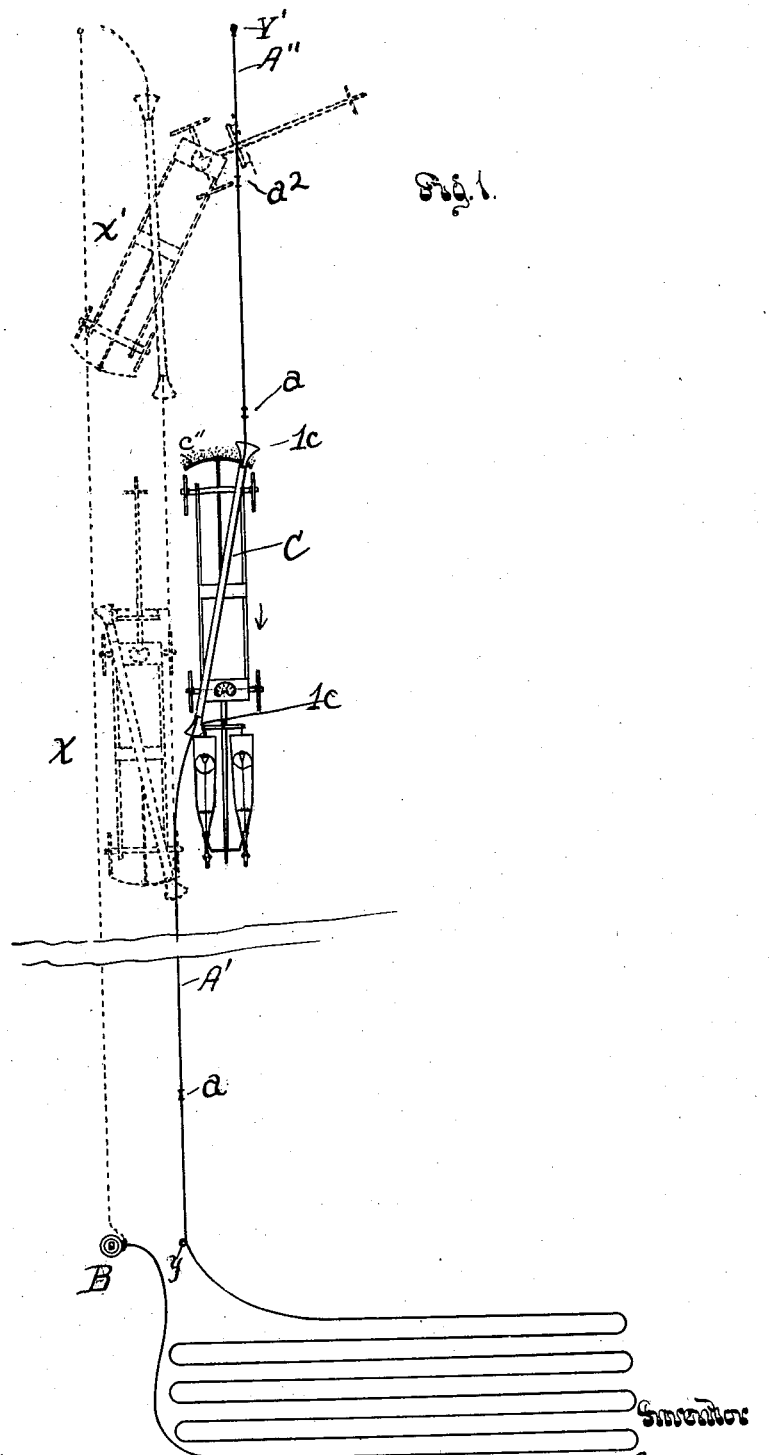

No. 628,127. Patented July 4, 1899.
W. H. SHINN.
SURFACE IRRIGATING SYSTEM FOR SPRINKLING FARM LANDS, ROADS, OR STREETS.
(Application filed Mar. 18, 1899.)
(No Model.) 3 Sheets—Sheet 1.

No. 628,127. Patented July 4, 1899.
W. H. SHINN.
SURFACE IRRIGATING SYSTEM FOR SPRINKLING FARM LANDS, ROADS, OR STREETS.
(Application filed Mar. 18, 1899.)
(No Model.) 3 Sheets—Sheet 2.
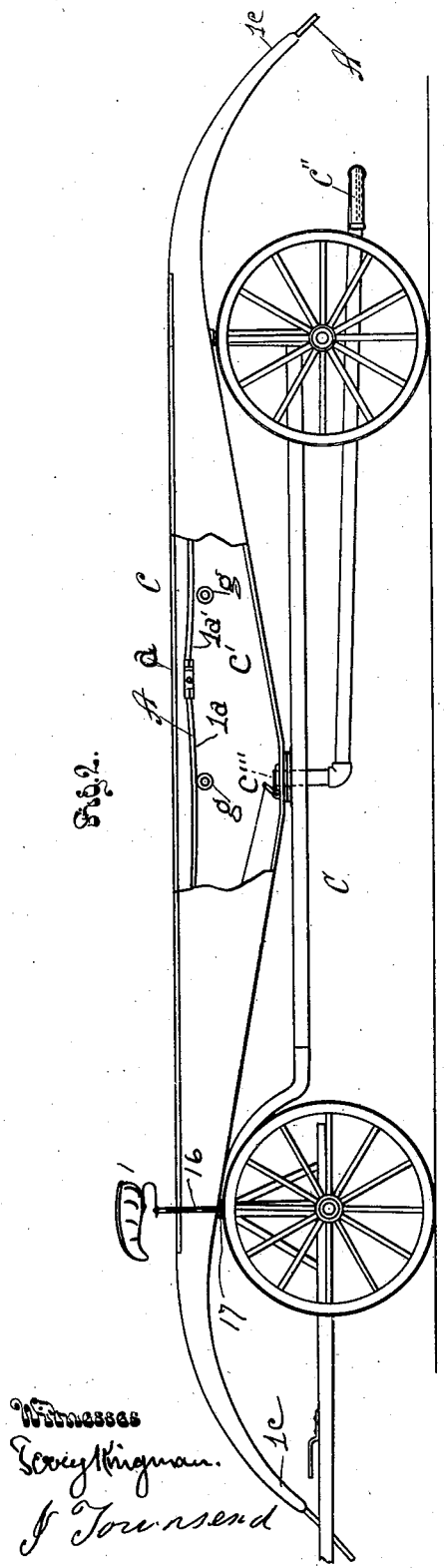
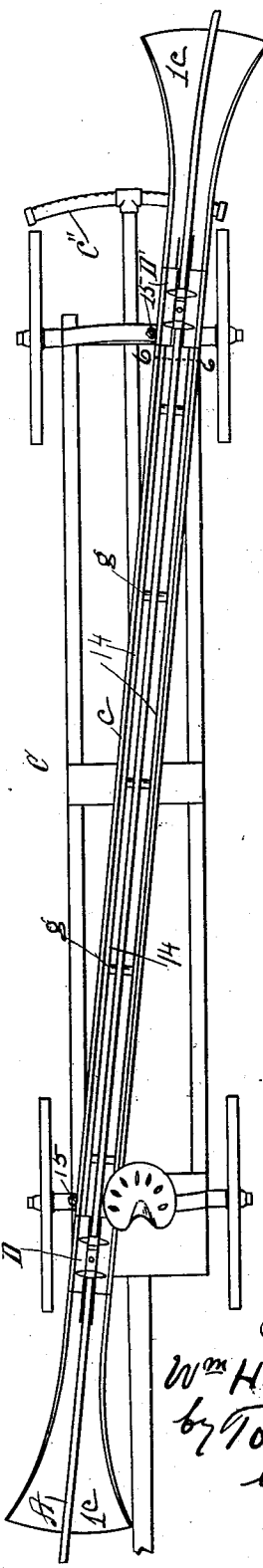

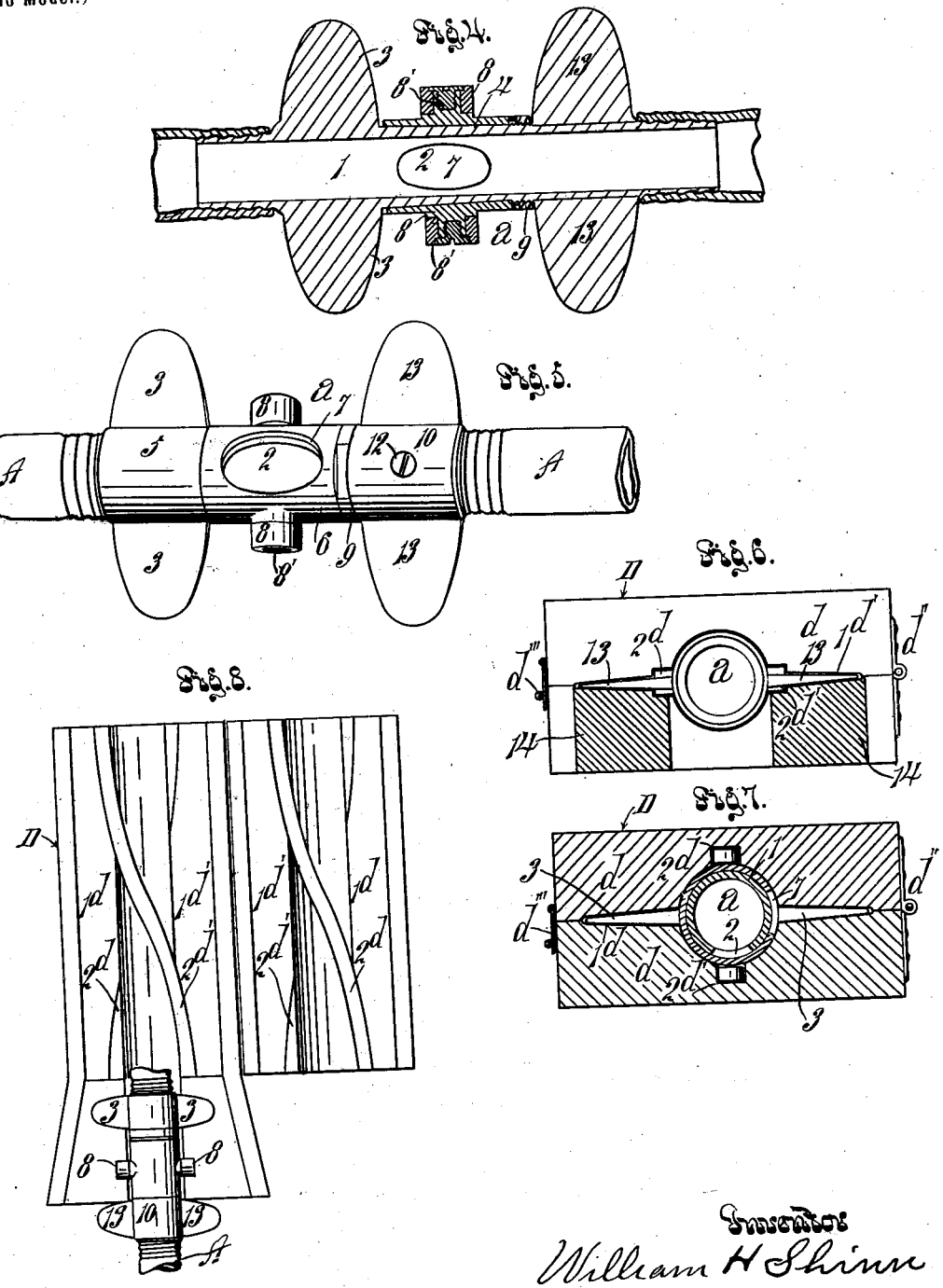

UNITED STATES PATENT OFFICE.

WILLIAM H. SHINN, OF LOS ANGELES, CALIFORNIA.

SURFACE-IRRIGATING SYSTEM FOR SPRINKLING FARM-LANDS, ROADS, OR STREETS.

SPECIFICATION forming part of Letters Patent No. 628,127, dated July 4, 1899.

Application filed March 18, 1899. Serial No. 709,675. (No model.)

*To all whom it may concern:*

Be it known that I, WILLIAM H. SHINN, residing at Los Angeles, in the county of Los Angeles and State of California, have invented a new and useful Surface-Irrigating System for Sprinkling Farm-Lands, Roads, or Streets, of which the following is a specification.

So far as I am aware there are three systems of surface irrigation now in vogue—viz., first, the system by which water is run onto the ground from pipes or ditches; second, the system in which the water is sprinkled upon the ground by means of a nozzle attached to a hose or pipe, and, third, the system in which a sprinkler-nozzle is connected with a portable receptacle, which is filled at a hydrant or other stationary source of supply and is moved from there to the place of use. The ordinary street-sprinkler is an instance of the third system referred to. The first system is not practicable in many instances—for example, for irrigating rolling lands, for grain crops, and for other crops where it is not possible to furrow out. This system is also objectionable in that it is not economical of water and the water cannot be evenly distributed over the ground to be irrigated. The second system is also impracticable in certain instances—for example, for irrigating large grain-fields or large fields which require to be cultivated. The third system is also impracticable for rolling lands or for cultivated fields, owing to the great weight of water required to be drawn in the sprinkling-wagon. A further objection arises with such system because of the expense of time and labor required for filling the tank and driving to and fro between the place of filling and the place of use. Such system is also objectionable for irrigating cultivated fields on account of the necessity of driving so frequently over the ground.

An object of my invention is to provide a system of irrigation by means of which the water can be applied rapidly and economically to large fields, cultivated or uncultivated, rolling or level.

My invention is also applicable as a superior means for rapidly and economically sprinkling roads or streets and can be employed on ordinary roads, hilly or level.

In my system of irrigation I provide a movable sprinkler with a continuous supply of water, so that I avoid the necessity of carrying a large amount of water and also avoid the necessity of frequent travel to and from a hydrant.

My newly-invented irrigation system comprises a hose or other suitable flexible pipe connected with a source of water-supply and provided at intervals with valved outlets and a traveling sprinkler provided with a receptacle to be drawn along the hose to receive water from the outlets and also provided with a water-distributing device connected with the receptacle. By this means I do away with the necessity of hauling a great weight of water to supply the distributer and am enabled to distribute the water evenly over the ground in any desired quantity and am enabled to perform the work rapidly and with but slight labor, attention, and expense.

My invention also comprises the valve and mechanism for opening and closing the same, which I have invented in order to adapt my system for practical use.

The accompanying drawings illustrate my invention.

Figure 1 is a plan view of a portion of a field, showing my irrigating system in operation. Different stages of the work are indicated by dotted lines. Fig. 2 is a side elevation of a traveling sprinkler constructed in accordance with my invention. A fragment of the hose or flexible pipe is shown in position. Fig. 3 is a detail plan of the traveling sprinkler with parts broken away to expose the interior. A section of the hose or flexible pipe is shown in place and the valve opening and closing devices are shown open to allow the placing or removal of the hose. Fig. 4 is a longitudinal plan section of a fragment of the hose with valved coupling. The valve is shown open. Fig. 5 is a perspective view of a fragment of the pipe with the valved coupling open. Fig. 6 is an end elevation of the valve opener and closer with the valve just entering the same to be closed. The guide-rails are shown in section on line 6 6, Fig. 3. Fig. 7 is a cross-section of the valve opener and closer with a valve therein turned halfway in the operation of opening or closing. Fig. 8 is a developed plan of the inside of the valve opener and closer.

A indicates a hose-line connected by means of a connecting-hose A' with a source of water-supply, such as a hydrant B.

a indicates in a general way valved outlets at intervals along the hose-line. The hose-line is formed of sections coupled together by couplings formed of the barrels in which said valved outlets are made.

C indicates the traveling sprinkler provided with a hoseway c, with receptacle c' to receive the discharge from said outlets and also provided with a sprinkler-nozzle c'', connected with the receptacle. This sprinkler-nozzle may be of any of the well-known forms of sprinkler-nozzles—such, for instance, as those used on sprinkling-carts.

D indicates means on the traveling sprinkler for causing the valves to open upon entering the receptacle, and D' indicates means on the traveling sprinkler for causing the valves to close upon passing from said receptacle. The valve-opener and valve-closer are preferably duplicates of each other and in practice interchange functions with each other.

The valved couplings which connect the hose-line sections $1^a$ $1^{a'}$ consist of a coupling-barrel 1, with an opening 2 therein and with laterally-projecting guide-wings 3 projecting from opposite sides thereof to form supports and guides for the coupling as it passes through the valve opener and closer. The middle portion of the barrel is formed in a spigot 4, tapering from the shoulder or enlarged portion 5, which carries the guides 3. The outlet 2 is in the middle of the tapered portion.

6 indicates a valve-sleeve fitted upon the tapered portion or valve-spigot 4 and provided with a hole 7 to register with the hole in the barrel and also provided with lugs 8, which are preferably provided with rollers 8' to run in spiral grooves in the opener and closer.

9 indicates a set-nut to hold the sleeve in proper position on the tapered portion to form a water-tight joint thereon.

10 indicates a sleeve fitted upon the barrel to correspond with the enlargement 11, from which the guides 3 project and fastened on the barrel by a set-screw 12. This sleeve is provided with guide-wings 13, which correspond with the guides 3 in form and function. The guides 3 and 13 are arranged in one plane and opposite to each other, and the lugs 8 are set in one plane and opposite each other. The hole 7 is midway between the lugs, so that when the valve is fully closed or opened the lugs and guides are all in one plane. The guideways and guide-rails for the guides are preferably arranged in a horizontal plane, so that the guides and lugs can be in a horizontal plane with the outlet 2 downward, as shown in Fig. 6.

The valve opener and closer is preferably formed in duplicate halves, as d d', hinged together by a hinge d'' at one side and fastened by a latch d''' at the other side. The halves are channeled longitudinally to form horizontal guideways $1^d$ $1^{d'}$ and are also channeled to form spiral guideways $2^d$ $2^{d'}$. The guideways formed at $1^d$ $1^{d'}$ are of such form as to receive and guide the guides 3 13, while the guideways $2^d$ $2^{d'}$ are arranged to receive the lugs 8. Guide-rails 14 14 are provided to support the guides $1^d$ $1^{d'}$ in passing from and to the opener and closer. These rails may be arranged to support the guides alone or may be arranged, as shown in Fig. 6, to support both the guides and the lugs. They hold the valve in position with the opening downward, ar indicated in Fig. 6. The guide-rails guide the guides and the lugs into their appropriate guideways in the opener and closer.

Preferably the combined hoseway and receptacle c c' is arranged diagonally across the wagon from the front at one side of the vehicle to the rear at the other side of the vehicle. The object of this is to cause the hose to be taken onto the vehicle at one side and discharged at the other, so that as the vehicle passes across the field the hose will be shifted over to lie along the edge of the sprinkled ground.

For convenience of operation the hoseway and receptacle is pivoted to the body of the vehicle so as to turn completely around thereon. By reference to Fig. 1 the purpose of this will be understood. In practical operation the hose A' is attached to the hydrant B and is of sufficient length to extend from the hydrant to the edge of the portion of the field to be irrigated. Let it be assumed in Fig. 1 that the hydrant B is located at the center of a forty-acre tract of land. The irrigating will be conducted over an area of ten acres at a time—that is to say, the hose A' will be six hundred and sixty feet long, and the hose-line A attached thereto will be of sufficient length to reach from the mid-line of the field to the end of the field. The hose-line A will first be laid by a hose-cart (not shown) in a right line from the hose to the middle of the end of the field and will be placed in the hoseway and in the openers and closers, and the tops of the openers and closers will be locked in position upon the hose.

The hose-line is capped at the last valved outlet, as at $a^2$, so that when the water is turned on it will not escape at the end. The combined guideway and receptacle is swung into position diagonally across the vehicle, as indicated in dotted lines at X in Fig. 1, and is locked in place by catches 15, and the portion of the hose which projects rearwardly is then staked to the ground by a stake, as at Y, Fig. 1. The farther end of the hose-line is provided with a rope A'', which is staked in place by a stake, as at Y'.

The vehicle is now ready for the sprinkling operation, and, the water being turned on at the hydrant B, the hose is filled, and the water flows out through the outlet a of the hose-line, said outlet having been opened to allow the water to flow into the receptacle. When the receptacle is sufficiently filled for sprinkling purposes, the valve c''' of the sprinkler is opened and the team is driven forward at such a speed as may be requisite for sprinkling the earth to the required extent. Then the vehicle will be driven along the hose-line toward the end of the field, and as it proceeds the hoseway and the opener and closer will run along the hose, thus bringing the valves a successively into the opener at the front end of the hoseway. The hoseway is provided with a hose-lifting device or apron, as at 1°, and the projecting guides 3 and 13 engage the same, and the valve is thereby held in true position to enter the valve-opener. The lugs and guides and the outlet-holes in the barrel and valve are preferably so located with relation to each other that the lugs are in line between the guides, so as not to be in danger of being thrown to open the valve, except when acted upon by the opener and closer. The guideways in the opener and closer are of different form in cross-section, and the lugs and guides are also of different form in cross-section, so that the lugs will follow along the spiral guideways therefor and rotate the sleeve, while the guides, which are fastened to the sleeve, slide along the straight guideways and hold the sleeve against turning. The guides are thin and long, and the lugs are comparatively short and thick. The spiral grooves make one half-turn, so that the lugs in passing through the spiral grooves cause the sleeve to turn half a revolution, thus bringing the holes 2 and 7 of the barrel and sleeve to register with each other, so that as soon as the valve has completely passed through the valve-opener the outlet will be fully opened and the water will be discharged into the receptacle. When the valve has passed through the receptacle-hoseway above the receptacle, it enters the valve-closer at the rear end of the combined receptacle and hoseway, and the operation of the valve-sleeve just described is repeated, thus turning the sleeve another half-rotation, thereby to close the outlet. As the vehicle advances the hose shifts from the right line in which it was at first laid to a right line extending rearward from the rear end of the hoseway, which is at the edge of the ground covered by the sprinkler, so that the hose is left ready to be taken up by the hose-lifter on the return trip. When the vehicle approaches the end of the field, the attendant will release the end of the hose where it is fastened to the ground at the end of the field and will also unlock the hoseway to allow the same to turn on the body of the vehicle. Then the vehicle will be turned, as at X', and will be driven to the opposite side of the extended line of the hose which has been laid by the vehicle. Then the vehicle will be turned to return toward the middle of the field and the hoseway will be locked thereon in a position reverse that which it occupied when going toward the end of the field. The stake Y' by which the hose is fastened to the ground is then set at the farther side of the sprinkler and the sprinkler is driven back along the line of hose, thus taking up the hose and repeating the sprinkling, as first herein described. When the vehicle approaches the end of the hose-line, the restaking of the hose-line and the turning of the vehicle is repeated and the work is continued as before, and so on until the irrigating has extended over the portion of land to be covered by the hose in use.

g indicates rollers in the receptacle below the path of the valve-outlets a to support the swagging hose between the valves.

The seat-post 16 is seated in a socket, (not shown,) so as to be removable in order to allow the bolster 17 of the vehicle-bed to pass beneath the hoseway and receptacle c c'.

Now, having described my invention, what I claim as new, and desire to secure by Letters Patent, is—

1. An irrigating system comprising a hose connected with a source of supply and provided with valved outlets at intervals; and a traveling sprinkler provided with a receptacle to be drawn along the hose to receive water from the outlets, and also provided with a water-distributer connected with the receptacle.

2. The combination of a hose connected with a source of supply and provided at intervals with valved outlets; a traveling sprinkler provided with a receptacle to receive the discharge from said outlets and also provided with a water-distributer connected with the receptacle; a valve-opener on the traveling sprinkler for causing the valves to open upon entering the receptacle; and a valve-closer on the traveling sprinkler for causing the valves to close upon passing from said receptacle.

3. The combination of a traveling sprinkler provided with a receptacle and with a water-distributer connected with said receptacle; a hose connected with a source of supply and arranged to lead through the receptacle; a valve-barrel in the hose and provided with an outlet; a valve-collar on the barrel to open and close the outlet and provided with projecting lugs; means for preventing the hose from rotating; guides on the traveling sprinkler to engage the projections of the collar to partially rotate the same to open the outlet when the valve enters the receptacle; and guides on the traveling sprinkler to engage the projections on the valve-collar to rotate the collar to close the outlet upon leaving the receptacle.

4. A valve comprising a barrel provided with an opening and with projecting guides; a sleeve on the barrel provided with a projecting lug and with an opening to register with the opening of the barrel.

5. A valve comprising a barrel provided with an opening therein and with laterally-projecting guides; a sleeve on the barrel provided with a lug and with an opening to register with the opening of the barrel, the cross-sectional area of said lug being different from the cross-sectional area of said wings.

6. A sprinkler-vehicle provided with a hoseway extending from front to rear; a receptacle under the way; and a water-distributer connected with the receptacle.

7. A sprinkler-vehicle having a hoseway extending from end to end and provided with a hose-lifting device at the front; a receptacle beneath the hoseway and provided with a bottom which has its lowest part at the middle of the vehicle; a water-distributer; and a pipe connecting the water-distributer with the lowest part of the receptacle.

8. A sprinkler-vehicle provided with a hoseway extending diagonally from the front of the vehicle at one side thereof to the rear of the vehicle at the other side thereof and having a liquid-receptacle below the hoseway; and a water-distributer connected with the liquid-receptacle.

9. In a sprinkler-vehicle, a hoseway provided with a liquid-receptacle and pivotally mounted on the vehicle; and a water-distributer carried by the vehicle and connected with the receptacle; said receptacle being connected with the hoseway to receive liquid therefrom substantially as set forth.

10. The combination of a vehicle; a hoseway pivotally mounted thereon and provided with a receptacle; a catch for fastening the hoseway at different positions relative to the axis of the vehicle; and a water-distributer carried by the vehicle and connected with the receptacle.

11. The combination with a sprinkler-vehicle, of a hoseway provided with two side rails and a receptacle connected with a water-distributer; and a hose with laterally-projecting guides to rest on the rails and a valved outlet substantially as set forth.

12. The combination with a traveling sprinkler, of a hose provided with projecting guides and a valved outlet with a projecting lug on the valve; and a device on the traveling sprinkler provided with guideways for the said guides and provided with a spirally-arranged guideway for the lug.

13. The combination with a traveling sprinkler; of a hose provided with projecting guides and a valved outlet with a projecting lug on the valve; and a device provided with guideways for the guides and provided with oppositely-arranged spiral guideways for the lug.

14. The valve opener and closer set forth comprising two members hinged together and grooved to form a hoseway and provided with two guideways and with spiral guideways, substantially as set forth.

WILLIAM H. SHINN.

Witnesses:
JAMES R. TOWNSEND,
F. M. TOWNSEND.